US010096037B2

(12) United States Patent
Butler, IV et al.

(10) Patent No.: US 10,096,037 B2
(45) Date of Patent: Oct. 9, 2018

(54) INFERRING PURCHASE INTENT USING NON-PAYMENT TRANSACTION EVENTS

(71) Applicant: GOOGLE INC., Mountain View, CA (US)

(72) Inventors: Harry Lee Butler, IV, New York, NY (US); Glenn Berntson, Jersey City, NJ (US); Glenn Thrope, New York, NY (US); Xiaohang Wang, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 265 days.

(21) Appl. No.: 14/595,193

(22) Filed: Jan. 12, 2015

(65) Prior Publication Data

US 2016/0203506 A1 Jul. 14, 2016

(51) Int. Cl.
*G06Q 30/02* (2012.01)
*G06Q 20/12* (2012.01)
*G06Q 20/20* (2012.01)

(52) U.S. Cl.
CPC ......... *G06Q 30/0222* (2013.01); *G06Q 20/12* (2013.01); *G06Q 20/20* (2013.01); *G06Q 30/0226* (2013.01); *G06Q 30/0238* (2013.01)

(58) Field of Classification Search
None
See application file for complete search history.

(56) References Cited

U.S. PATENT DOCUMENTS

| 7,797,196 | B1 | 9/2010 | Aaron et al. | |
|---|---|---|---|---|
| 8,078,152 | B2 | 12/2011 | Partridge et al. | |
| 8,751,435 | B2 | 6/2014 | Sridharan et al. | |
| 8,775,275 | B1 | 7/2014 | Pope | |
| 2010/0030567 | A1* | 2/2010 | Zalewski | G06Q 10/063 705/1.1 |
| 2011/0246284 | A1* | 10/2011 | Chaikin | G06Q 20/105 705/14.38 |
| 2012/0072280 | A1* | 3/2012 | Lin | G06Q 30/00 705/14.45 |
| 2012/0185317 | A1* | 7/2012 | Wong | G06Q 30/0222 705/14.23 |
| 2014/0172546 | A1* | 6/2014 | Compain | G06Q 30/0246 705/14.45 |

* cited by examiner

*Primary Examiner* — James M Detweiler
(74) *Attorney, Agent, or Firm* — Johnson, Marcou & Isaacs, LLC (57) ABSTRACT

Inferring purchase intent using non-payment transaction signals predicts whether a payment transaction has been completed based on non-payment information. An account system that operates outside of the payment path does not take part in and the approval of a financial transaction between the user and the merchant system, distributes an offer to the user. The user completes a financial payment transaction with the merchant and the account system determines whether a trigger event has occurred. The user performs an action or enters information using the user computing device, and the user computing device transmits an indication of the action to the account system. In another example, the account system receives notification from another system or device. The account system determines whether the action is a trigger event and the predictive model determines whether the user completed a financial transaction and/or redeemed the distributed offer.

12 Claims, 4 Drawing Sheets

INFERRING PURCHASE INTENT USING NON-PAYMENT TRANSACTION EVENTS

TECHNICAL FIELD

The present disclosure relates to inferring completion of a consumer purchase transaction, providing improved data gathering, improved understanding of how products are being used, and improved logging of transactions outside of the financial transaction path and without confirmation of a payment transaction.

BACKGROUND

In a conventional merchant-consumer financial transaction, the consumer provides financial account information to the merchant by way of swiping a card, entering the account number, scanning a code comprising the account number, reading the account number to the merchant, or otherwise transmitting the account number to a merchant system. The merchant system's point of sale terminal or online payment processor submits a payment request to the issuer of the account through the corresponding card network. If funds are available, the issuer sends an authorization code to the merchant system to signal approval of the payment transaction. Systems and devices that are outside of or not a part of the financial transaction path are not notified and are unable to determine that the financial transaction was approved and completed unless the merchant or consumer provide confirmation of the completion.

SUMMARY

In certain example aspects described herein, inferring purchase intent using non-payment transaction signals comprises predicting whether a payment transaction has been completed based on non-payment information. An account management system that operates outside of the financial payment path and does not take part in does not take part in the approval of a financial transaction between the user and the merchant system, distributes an offer to the user. In another example embodiment, the account management system does not receive a notification that the offer was redeemed and does not take part in the redemption of the offer outside of distributing the offer to the user. However, the account management system infers the completion of the payment transaction between the user and the merchant system based on one or more non-payment transaction signals.

The user completes a financial payment transaction with the merchant system and the account management system determines whether a trigger event has occurred. The user performs an action or enters information using a user computing device, and the user computing device transmits an indication of the action to the account management system. In another example, the account management system receives notification from another system or device. The account management system determines whether the action is a trigger event and determines whether the user completed a financial transaction and/or redeemed the distributed offer based on the triggering event.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

The example embodiments described herein provide methods and systems that enable inferring purchase intent using non-payment transaction signals. In an example embodiment, a user completes a purchase transaction with a merchant system. An account management system is not a part of the purchase transaction and therefore, outside of the financial transaction path (for example, the account management system is not the merchant system, the issuer system, or any other system involved in the approval or processing of the financial transaction). However, the account management system infers the completion of the payment transaction between the user and the merchant system based on one or more non-payment transaction signals.

In an example embodiment, an account management system creates a predictive model or trains a classifier model to predict whether a payment transaction has been completed based on non-payment information. In an example embodiment, the predictive model is an artificial neural network or other form of adaptive system model, wherein the system analyzes data and relationships to find patterns in data. In another example embodiment, the classifier model is a Gaussian Mixture Model, decision tree, Markov Decision Process, or other mathematical framework for modeling decision making. In an example embodiment, the model is trained based on historical transaction data to predict when a payment transaction has occurred based on non-payment signal data received by the account management system. In an example embodiment, the process is an ongoing learning process, wherein data is continuously added to the account management system and the model is continuously updated. In an example embodiment, a user operating the user computing device enables a payment transaction prediction feature on the user computing device.

The account management system distributes an offer to the user. In an example embodiment, the account management system logs an indication that the offer was distributed to, viewed by, or saved by the user. In an example embodiment, the account management system operates outside of the financial payment path and does not take part in the approval of a financial transaction between the user and the merchant system. In another example embodiment, the account management system does not receive a notification that the offer was redeemed and does not take part in the redemption of the offer outside of distributing the offer to the user. For example, the offer distributed to the user comprises an indication that the Merchant X is having a sale on Product B. However, the user is not required to present the offer to receive the sale price on Product B. In this example, the account management system presented the offer to the user and may have knowledge that the user viewed the offer, but it does not have knowledge as to whether the user completed a purchase with Merchant X.

The user completes a financial payment transaction with the merchant system. The user may or may not redeem the offer distributed by the account management system as a part of the financial payment transaction. The account management system determines whether a trigger event has occurred. In an example embodiment, the account management system continuously monitors for a trigger event to occur. In this embodiment, the account management system is not a part of the financial payment transaction, so it determines that a transaction occurred by monitoring for specified triggering events. In an example embodiment, the user performs an action or enters information using the user computing device. In an example embodiment, the user computing device logs the action, a location where the action occurred, and/or a time that the action occurred. The user computing device transmits an indication of the action to the account management system and the account management system determines whether the action is a trigger event. For example, the user may access a saved offer or financial account information at a merchant location. The user may mark a gift card as redeemed or manually adjust a gift card balance in a digital wallet application on the user computing device. In another example embodiment, the account management system receives notification from another system or device, for example a gift card system or a loyalty system. For example, the user registered or linked a gift card or loyalty account to the user's digital wallet account managed by the account management system. The account management system receives a notification from a system managing the gift card that the balance has changed or from the system managing the loyalty account that the loyalty balance has changed. In another example embodiment, the user manually adjusts the gift card and/or loyalty account balance. In another example embodiment, the account management system receives a copy of the payment receipt. In this example embodiment, the account management system is capable of extracting information from the receipt and determining that the receipt is for a payment transaction. In another example embodiment, the user computing device may transmit a notification that the user was in the merchant's retail location. The account management system uses the logged trigger events to determine that the user completed a financial transaction and also to determine that the user redeemed the distributed offer.

By using and relying on the methods and systems described herein, the account management system is able to infer that the purchase transaction was completed without being a part of the transaction or receiving payment transaction signals. As such, the systems and methods described herein may be employed to close the loop for offer systems and enable the system to determine performance-based pricing for offers without the offer system having to be a part of the offer redemption, to provide new or additional content to the user, and to more accurately determine which offers to provide to a user. The systems and methods described herein may also be employed to provide a more accurate and expedited understanding of how products (for example, gift cards) are being used. Additionally, the systems and methods described herein may also be employed to provide the user with up-to-date and accurate records of purchases made. Hence, the systems and methods described herein bridge the gap between the online and offline worlds and allow for the interaction between different types of computing technologies (for example, merchant point-of-sale devices, user mobile computing devices, and account management system computing devices) to achieve improved data gathering, improved understanding of how products are being used, and improved logging of transactions outside of the financial transaction path and without confirmation of a payment transaction.

Various example embodiments will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

Figure 1:
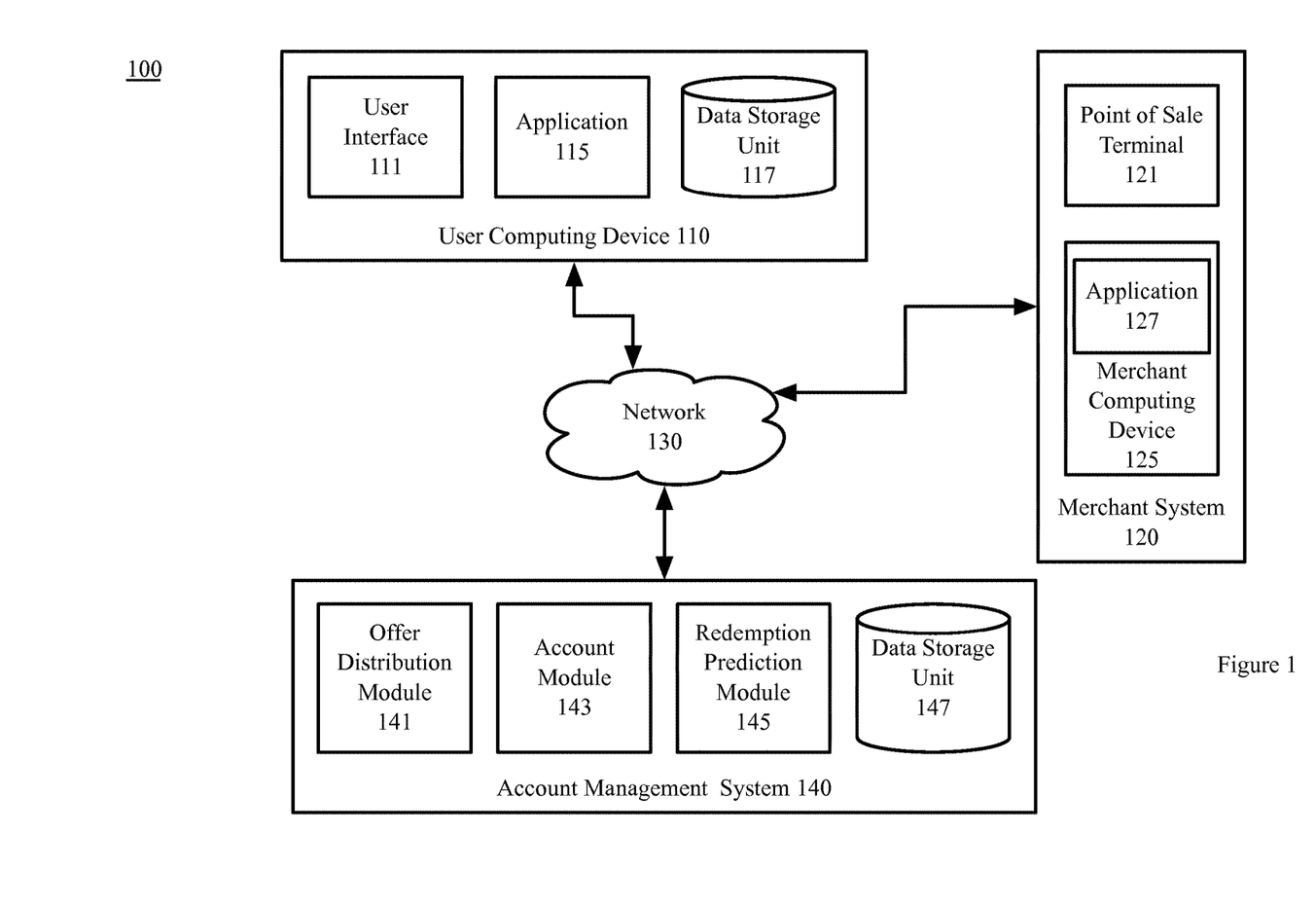
FIG. 1 is a block diagram depicting a purchase inference system, in accordance with certain example embodiments.

FIG. 1 is a block diagram depicting a purchase inference system, in accordance with certain example embodiments. As depicted in FIG. 1, the exemplary operating environment 100 comprises a user computing device 110, a merchant computing system 120, and an account management computing system 140 that are configured to communicate with one another via one or more networks 130. In another example embodiment, two or more of these systems (including systems 110, 120, and 140) are integrated into the same system. In some embodiments, a user associated with a device must install an application and/or make a feature selection to obtain the benefits of the techniques described herein.

Each network 130 includes a wired or wireless telecommunication means by which network systems (including systems 110, 120, and 140) can communicate and exchange data. For example, each network 130 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network computing system (including systems 110, 120, and 140) includes a device having a communication module capable of transmitting and receiving data over the network 130. For example, each network system (including systems 110, 120, and 140) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 130. In the example embodiment depicted in FIG. 1, the network computing systems (including systems 110, 120, and 140) are operated by users, merchants, and account management system operators, respectively.

The merchant computing system 120 comprises at least one point of sale (POS) terminal 121 that is capable of processing a purchase transaction initiated by a user, for example, a cash register. In an example embodiment, the merchant operates a commercial store and the user indicates a desire to make a purchase by presenting a form of payment at the POS terminal 121. In another example embodiment, the merchant operates an online store and the user indicates a desire to make a purchase by clicking a link or "checkout" button on a website. In another example embodiment, the user computing device 110 is configured to perform the functions of the POS terminal 121. In this example, the user scans and/or pays for the transaction via the user computing device 110 without interacting with the POS terminal 121.

In an example embodiment, the merchant system 120 is capable of communicating with the account management system 140 via a merchant computing device 125 and an application 127. The merchant computing device 125 may be an integrated part of the POS terminal or a standalone hardware device, in accordance with alternative example embodiments.

In an example embodiment, the user computing device 110 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that includes or is coupled to a web server, or other suitable application for interacting with the account management system 140. The user can use the user computing device 110 to view offers distributed by the account management system 140 via a user interface 111 and an application 115. The application 115 is a program, function, routine, applet or similar entity that exists on and performs its operations on the user computing device 110. For example, the application 115 may be one or more of a shopping application, a merchant system 120 application, an account management system 140 application, an Internet browser, a digital wallet application, a loyalty card application, another value-added application, a user interface 111 application, or other suitable application operating on the user computing device 110. In some embodiments, the user must install an application 115 and/or make a feature selection on the user computing device 110 to obtain the benefits of the techniques described herein.

In an example embodiment, selected offers, financial account information, loyalty account information, gift card account information, and related information is stored in the data storage unit 117. In an example embodiment, the data storage unit 117 and application 115 may be implemented in a secure element or other secure memory (not shown) on the user computing device 110. In another example embodiment, the data storage unit 117 may be a separate memory unit resident on the user computing device 110. In an example embodiment, the data storage unit 117 can include any local or remote data storage structure accessible to the user computing device 110 suitable for storing information. In an example embodiment, the data storage unit 117 stores encrypted information, such as HTML5 local storage.

An example user computing device 110 communicates with the account management system 140. An example account management system 140 comprises an offer distribution module 141, account module 143, a redemption prediction module 145, and a data storage unit 147. An example offer distribution module 141 receives offers from the merchant system 120 or a third party system and distributes the offers to users for review and selection. In another example embodiment, the offer system 140 may generate web-based user interfaces providing forms for the merchant system 120 or third party system to create offers. The offers may be prepaid offers, wherein the user pays a specified amount for the offer prior to redeeming the offer with the merchant system 120. In another example embodiment, the offers may be advertisements or present information to the user. In this example embodiment, the account management system 140 does not receive a notification that the offer was redeemed and does not take part in the redemption of the offer outside of distributing the offer to the user. For example, the offer distributed to the user comprises an indication that the Merchant X is having a sale on Product B. However, the user is not required to present the offer to receive the sale price on Product B. In this example, the account management system 140 presented the offer to the user, and may have knowledge that the user viewed the offer, but it does not have knowledge as to whether the user completed a purchase with Merchant X.

In an example embodiment, the user selects the offer distributed by the account management system 140. In an example embodiment, the user selects an offer by clicking on it and saving it in the user's digital wallet application 115, which may then be uploaded to the account management system 140 and associated with the user's account. If the offer is a prepaid offer, then the user may pay for the offer prior to saving the offer in the user's digital wallet application 115. In example embodiment, an offer may be displayed in the form of a voucher or coupon in response to user's Internet search. In an alternative example embodiment, the user can use a smart phone application 115 to select the offer.

In an example embodiment, the account module 143 manages the registration of user and maintains an account for the user. In an example embodiment, the user account module 143 may collect anonymous, non-personal information for the user. For example, the user account module 143 may generate an anonymous user account identifier, such that the user is not personally identifiable. In another example embodiment, the user account module 143 may generate web-based user interfaces providing forms for the user to optionally register for an account management system 140 account.

The redemption prediction module 145 gathers historical transaction data to predict when a payment transaction has occurred based on non-payment signal data received by the account management system. In an example embodiment, the redemption prediction module 145 analyzes the data and learns to identify features, events, and/or signals that correspond to the completion of a purchase transaction and to detect patterns that will aid in the identification of when a purchase transaction has occurred. In an example embodiment, the redemption prediction module 145 creates a prediction model. The prediction model is an artificial neural network or other form of adaptive system model, wherein the redemption prediction module 145 analyzes data and relationships to find patterns in data. In an example embodiment, this process is an ongoing learning process, wherein data is continuously added to the redemption prediction module 145 and the model is continuously updated. In an example embodiment, the data is saved in the data storage unit 147.

In an example embodiment, the data storage unit 147 can include any local or remote data storage structure accessible to the account management system 140 suitable for storing information. In an example embodiment, the data storage unit 147 stores encrypted information, such as HTML5 local storage.

Figure 4:
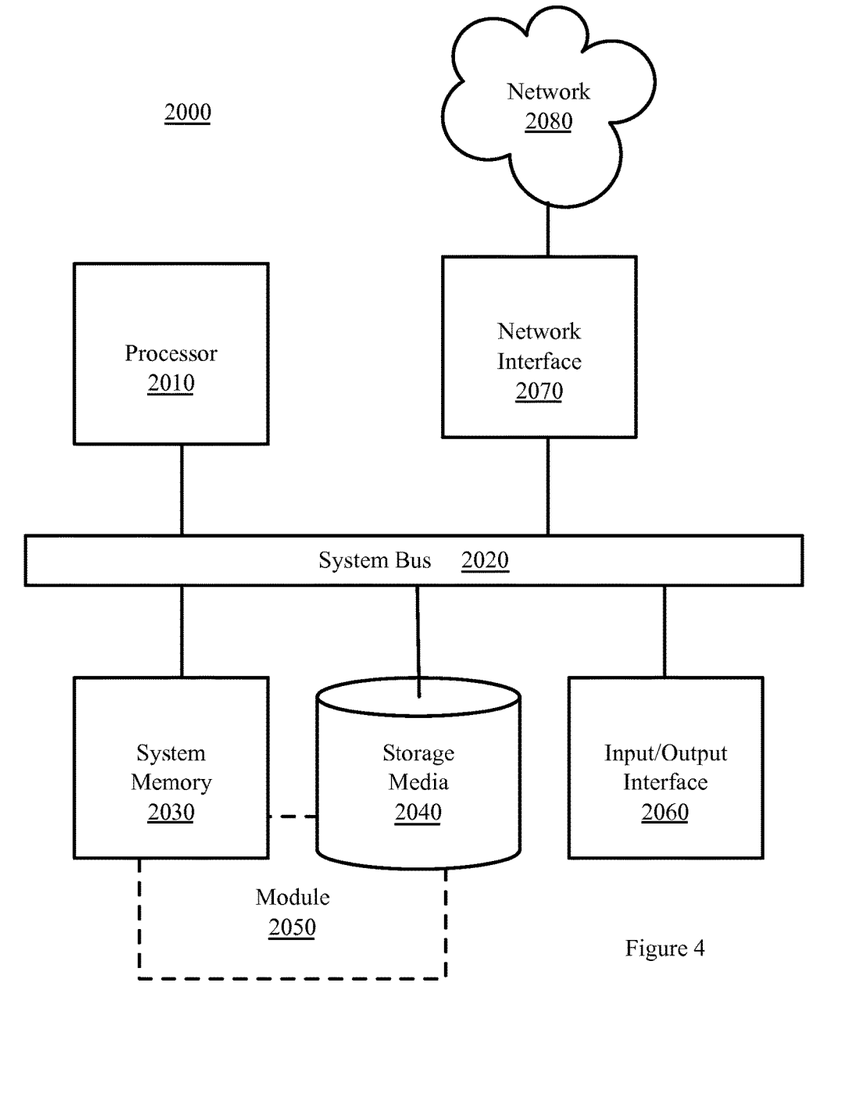
FIG. 4 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 4. Furthermore, any modules associated with any of these computing machines, such as modules described herein or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks, such as network 130. The network 130 may include any type of data or communications network, including any of the network technology discussed with respect to FIG. 4.

The components of the example operating environment 100 are described hereinafter with reference to the example methods illustrated in FIGS. 2-3. The example methods of FIGS. 2-3 may also be performed with other systems and in other environments.

Example System Processes

Figure 2:
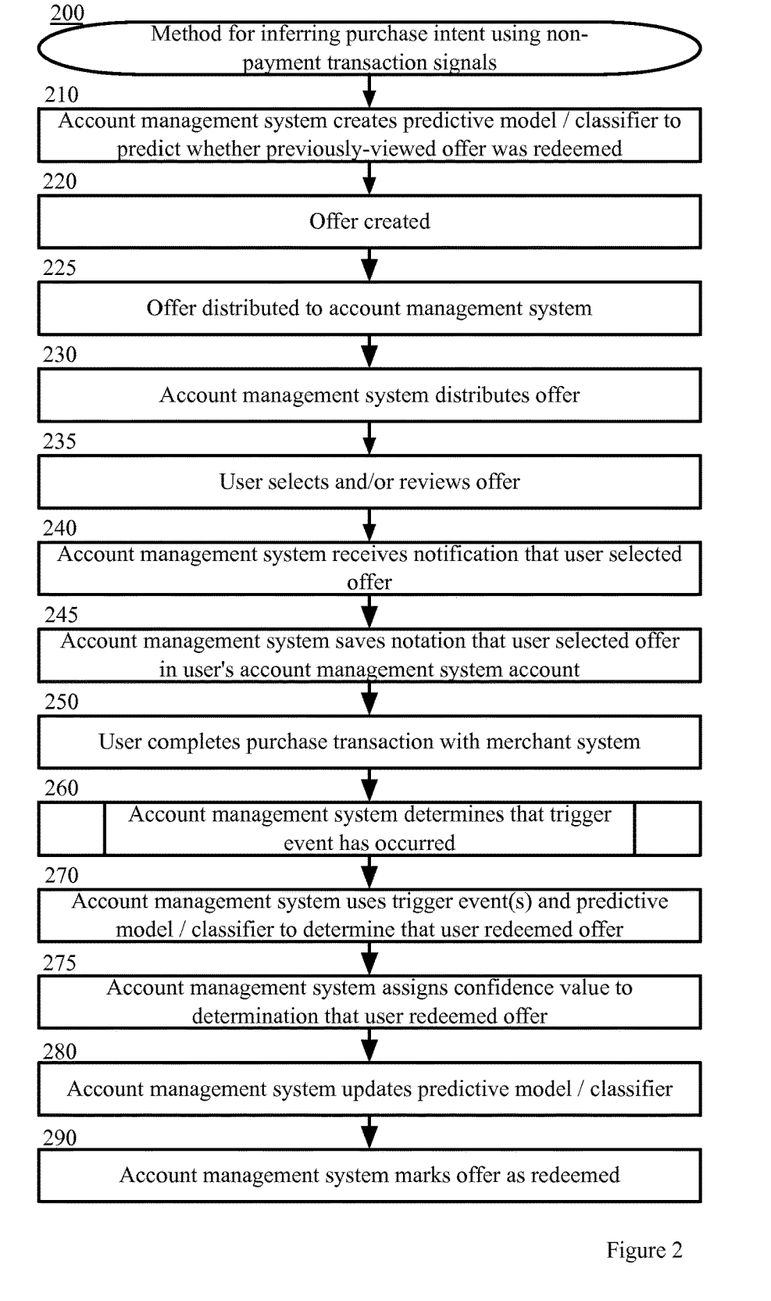
FIG. 2 is a block flow diagram depicting a method for inferring purchase intent using non-purchase payment transaction signals, in accordance with certain example embodiments.

FIG. 2 is a block flow diagram depicting a method for inferring purchase intent using non-purchase payment transaction signals, in accordance with certain example embodiments. The method 200 is described with reference to the components illustrated in FIG. 1.

In block 210, the account management system 140 creates a predictive model or classifier to that will be used to predict whether the user completed a financial purchase transaction with a merchant and/or redeemed an offer. In an example embodiment, the predictive model or classifier is an artificial neural network or other form of adaptive system model, wherein the model analyzes data and relationships to find patterns in data. An artificial neural network is a computational module that functions to process information, such as studying behavior, pattern recognition, forecasting, and data compression. An example predictive model or classifier may be hardware and software based or purely software based and run in computer models. In an example embodiment, the predictive model or classifier model comprises inputs (for example changes in gift card or loyalty account balances, selections of a saved offer, location data that corresponds to a merchant location, display of financial data, display of an offer, receipt data, and other data that suggests a financial transaction was completed) that are multiplied by weights and then computed by a mathematical function to determine the output (for example, the likelihood that a financial transaction was completed or an offer was redeemed). Depending on the weights, the computation will be different. In an example embodiment, an algorithm is used to adjust the weights of the predictive model or classifier in order to obtain the desired output from the network (for example, to accurately identify that a financial transaction was completed or an offer was redeemed). In an example embodiment, this process is an ongoing learning process, wherein non-payment transaction events are continuous added and the model/classifier is updated. As more training data is fed into the model, it will continuously improve.

In another example embodiment, the classifier model is a Gaussian Mixture Model, decision tree, Markov Decision Process, or other mathematical framework for modeling decision making. In an example embodiment, the model is trained based on historical data of a completed financial transaction or a redeemed offer to predict whether a financial transaction was completed or an offer was redeemed based on the data received by the account management system 140. In an example embodiment, the process is an ongoing learning process, wherein data is continuously added to the account management system 140 and the model is continuously updated.

In block 220, an offer is created. In an example embodiment, an offer is created by a merchant, manufacturer, and/or alternative offer provider and distributed to potential users. An offer provides an incentive for a user to purchase a product. Throughout this specification, the term "product" refers to tangible and intangible products, including services.

In an example embodiment, the offer is a non-prepaid offer (for example, a loyalty reward, a coupon, discounts, or other offer redeemable with a merchant, manufacturer, service provider, and/or provider of goods). In another example embodiment, the offer is a prepaid offer and the user pays a predetermined price for the goods and/or services.

The merchant system 120 or other provider of the offer specifies the offer details, by specifying the type of offer, the duration, the amount of the redemption, and additional pertinent redemption details when creating the offer. In an example embodiment, the merchant system 120 creates an offer by entering the offer details and redemption rules into a merchant computing device 125 to create an electronic record for the offer. In certain example embodiments, the merchant system 120 may input the offer details and redemption rules directly into the account management system 140 via the application 127 to create an electronic record for the offer in the account management system 140.

In an example embodiment, the merchant system 120 creates the offer outside of the account management system 140. In another example embodiment, the account management system 140 may generate web-based user interfaces providing forms for the merchant system 120 to create offers.

In block 225, the offer is distributed to the account management system 140. In an example embodiment, the account management system 140 receives the offer from the merchant, manufacturer, and/or alternative offer provider that created the offer. For example, the provider may communicate the electronic offer record to the account management system 140 via the network 130. As discussed previously, in another embodiment, the provider may create the electronic record for the offer in the account management system 140. The offer distribution module 141 receives the offer record and stores the offer record in the data storage unit 147.

In block 230, the account management system 140 distributes the offer. For example, the account management system 140 distributes the offer via the network 130 to multiple user computing devices 110 for presentation to the users via the user computing devices 110.

In an example embodiment, the account management system 140 distributes the offer through network channels selected by the creator of the offer, including display on cost per mille impression ("CPM"), pay per click ("PPC"), electronic correspondence, offers near me, and other advertising methods. In an example embodiment, the offer is a pay per click ("PPC") offer, wherein the creator of the offer pays a service fee to the account management system 140 for each time the offer is clicked by a user. In another example embodiment, the offer is a cost per mille ("CPM") or cost per thousand ("CPT") offers, wherein the creator of the offer pays a service fee to the offer system 140 for every 1000 page views. In yet another example embodiment, the offer is distributed through an "offers near me" model, wherein the offer is displayed in a selected search query that provides results that are physically within a set distance from the user's location. The creator of the offer may select multiple methods of distribution for the same offer. The creator of the offer may also create multiple offers to be distributed through the same or different network channels.

In block 235, a user reviews one or more of the distributed offers that are presented on the user computing device 110 and selects one or more offers distributed by the account management system 140. In an example embodiment, the user selects an offer by operating the user computing device 110 to click on the offer, to press a button to "save" the offer, or by other suitable input to indicate a desire to select and/or save the offer. In another example embodiment, the offer is a prepaid offer, and the user selects the offer by purchasing the offer.

In block 240, the account management system 140 receives a notification that the user selected the offer. In an example embodiment, when the user selects a particular offer, an electronic offer instance is created and transmitted by the user computing device 110 to the account management system 140. In an example embodiment, the notification is received by the account module 143. In this embodiment, the notification comprises an identification of the user so that the account management system 140 can identify the user's account management system 140 account. In another example embodiment, the identification comprises a non-personal identifier (for example, an identification number or code).

In block 245, the account management system 140 saves an indication that the user selected the offer. In an example embodiment, the account management system 140 saves the electronic offer instance in the user's account management system 140 account.

In block 250, the user completes a purchase transaction with the merchant. In an example embodiment, the purchase transaction comprises a cash transaction, a debit transaction, a credit transaction, a loyalty point redemption transaction, a prepaid transaction, or other form of purchase transaction. In an example embodiment, the account management system 140 does not participate in the purchase transaction. In this embodiment, the purchase transaction is processed according to the selected means and the account management system 140 is not notified of the desire to complete the transaction, approval of the financial transaction, or completion of the payment transaction. In an example embodiment, an issuer system, other than the account management system 140 approves a financial payment transaction and notifies the merchant system 120 of the approval.

In an example embodiment, the offer selected by the user is redeemed during the purchase transaction. In an example embodiment, the account management system 140 does not participate in the redemption of the offer. In this embodiment, the account management system 140 does not participate in the authorization, approval, or fraud verification of the offer when it is being redeemed. For example, the offer distributed to the user comprises an indication that the Merchant X is having a sale on Product B. However, the user is not required to present the offer to receive the sale price on Product B. In this example, the account management system 140 presented the offer to the user, and may have knowledge that the user viewed the offer, but it does not have knowledge as to whether the user completed a purchase with Merchant X.

In another example, the offer comprises a notification that Merchant Z is having a store-wide sale. However, the user is not required to present the offer to receive the benefit of the sale. In this example, the account management system 140 presented the offer to the user, and may have knowledge that the user viewed the offer, but it does not have knowledge as to whether the user completed a purchase with Merchant Z.

In yet another example, the offer comprises a manufacturer offer for Product C. However, the redemption of the offer is processed by the merchant system 120 and/or the manufacturer of Product C. In this example, the account management system 140 presented the offer to the user, and may have knowledge that the user viewed the offer, but it does not have knowledge as to whether the user completed a purchase of Product C.

In an example embodiment, the user uses the user computing device 110 to perform an action prior to, during, or after the purchase transaction. In an example embodiment, the action is not required for the purchase transaction and/or offer redemption to be completed. For example, the user access the user computing device 110 in the merchant location, an offer, gift account information, loyalty account information, or financial account information is presented by the user computing device 110, the user adjusts an account balance, directions are requested, or other action performed by the user computing device 110. In an example embodiment, the user computing device 110 logs the action, a location where the action occurred, and/or a time that the action occurred. In an example embodiment, the user computing device 110 transmits a notation of the action to the account management system 140. In another example embodiment, the account management system 140 is continuously monitoring or communicating with the user computing device 110 to detect when the user computing device 110 logs an action. In this example embodiment, the user enables a feature or option on the user computing device 110 to allow the device 110 to log the actions.

In block 260, the account management system 140 determines whether one or more trigger events have occurred. In an example embodiment, a trigger event comprises a signal, data, or other indication that may be used by the predictive model to determine a likelihood that a purchase transaction occurred and/or an offer was redeemed. In an example embodiment, the signals are received by the account management system 140 from the user computing device 110. In this example embodiment, the user enables a feature or option on the user computing device 110 to allow the device 110 to transmit notification of the signals to the account management system 140. In another example embodiment, the signals are received from one or more other systems. For example, a loyalty account system, a gift card account system, a receipt management system, or other non-account management system 140. In this embodiment, the user enables a feature or option to enable the system to transmit notifications to the account management system 140. The method for determining that a trigger event has occurred is described in more detail hereinafter with reference to the methods described in FIG. 3.

Figure 3:
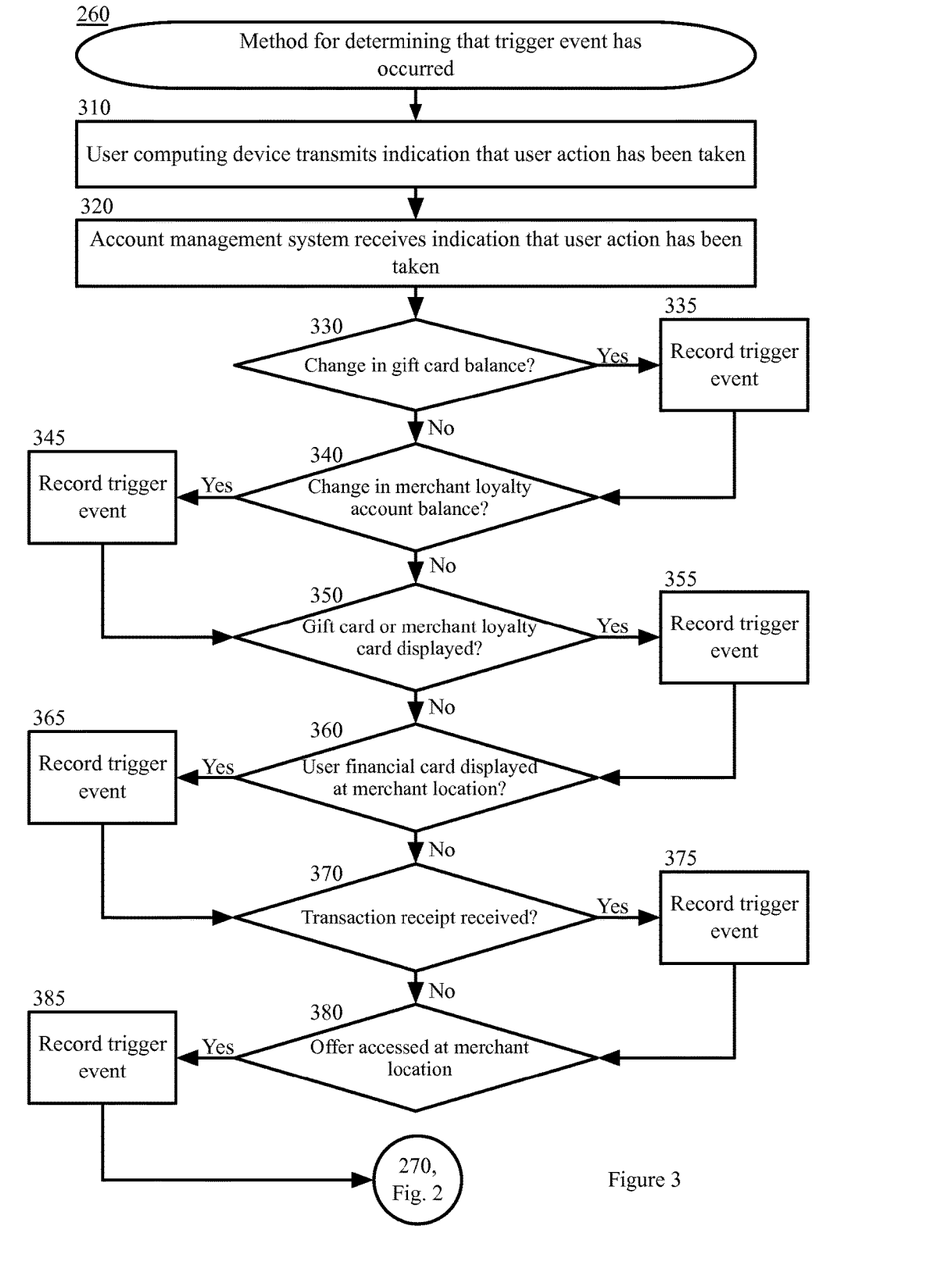
FIG. 3 is a block flow diagram depicting a method for determining that a trigger event has occurred, in accordance with certain example embodiments.

FIG. 3 is a block flow diagram depicting a method 260 for determining that a trigger event has occurred, in accordance with certain example embodiments, as referenced in block 260. The method 260 is described with reference to the components illustrated in FIG. 1.

In block 310, the user computing device 110 transmits an indication that a user action has been taken. In an example embodiment, the user computing device 110 continuously monitors for a number of user actions, for example, changes in user computing device 110 location, display of information on the user interface 111, account updates, receipt of information, and other actions determined by the predictive model to be related to a purchase transaction. In an example embodiment, a location of the user computing device 110 and a time is determined when the action is detected. In an example embodiment, the account management system 140 communicates new actions and updates to the user computing device 110 as the predictive model is updated. In another example embodiment, a system (for example, a loyalty account system, a gift card account system, a receipt management system, or other non-account management system 140) transmits the indication that the user action has been taken.

In block 320, the account management system 140 receives the indication that the user action has been taken. In an example embodiment, the indication comprises and identification of the user or an identifier that allows the account management system 140 to identify the user's account management system 140 account. In an example embodiment, the account management system 140 saves the indication in the user's account.

In an example embodiment, the account management system determines whether the indication comprises a trigger event. In an example embodiment, a trigger event comprises a signal, data, or other indication that may be used by the predictive model to determine a likelihood that a purchase transaction occurred and/or an offer was redeemed. In an example embodiment, the account management system 140 uses the indicated action in combination with a time that the action took place and/or a location of the user computing device 110 to determine a likelihood that a purchase transaction occurred and/or an offer was redeemed. In another example embodiment, the account management system 140 assigns weights to particular actions to determine a likelihood that a purchase transaction occurred and/or an offer was redeemed. For example, if an offer or financial account information was displayed at a merchant location, a greater weight may be assigned than if the same action was taken at a non-merchant location.

In block 330, the account management system 140 determines whether the indication comprises a change in a gift card balance. In an example embodiment, the user has associated or registered a gift card with the user's account management system 140 account. In this embodiment, the user may manually enter the account management system 140 account and update the gift card balance. In another example embodiment, the user may use an application 115 on the user computing device 110 to update the gift card balance. In yet another example embodiment, the account management system 140 may receive a notification of the change in gift card balance from a system that manages the user's gift card account.

If the account management system 140 determines that the indication comprises a change in a gift card balance, the method 260 proceeds to block 335 and the account management system logs the indication as a trigger event.

The method 260 then proceeds to block 340.

Returning to block 330, if the account management system 140 determines that the indication does not comprise a change in a gift card balance, the method 260 proceeds to block 340.

In block 340, the account management system 140 determines whether the indication comprises a change in a merchant loyalty account balance. In an example embodiment, the user has associated or registered a loyalty account with the user's account management system 140 account. In this embodiment, the user may manually enter the account management system 140 account and update the loyalty account balance. In another example embodiment, the user may use an application 115 on the user computing device 110 to update the loyalty account balance. In yet another example embodiment, the account management system 140 may receive a notification of the change in loyalty account balance from a system that manages the user's loyalty account.

If the account management system 140 determines that the indication comprises a change in a loyalty account balance, the method 260 proceeds to block 345 and the account management system logs the indication as a trigger event.

The method 260 then proceeds to block 350.

Returning to block 340, if the account management system 140 determines that the indication does not comprise a change in a loyalty account balance, the method 260 proceeds to block 350.

In block 350, the account management system 140 determines whether the indication comprises a display of a gift card or loyalty card on the user computing device 110. In an example embodiment, the user has saved an account identifier in the user computing device 110. When the user accessed the saved account identifier, the user computing device 110 displays the identifier for the user to read or present to the merchant system 120. In an example embodiment, the indication also comprises a location of the user computing device 110 when the identifier was displayed. In this embodiment, the account management system 140 uses the location to determine whether it corresponds to a merchant location.

If the account management system 140 determines that the indication comprises a display of a gift card or loyalty card on the user computing device 110, the method 260 proceeds to block 355 and the account management system logs the indication as a trigger event.

The method 260 then proceeds to block 360.

Returning to block 350, if the account management system 140 determines that the indication does not comprise a display of a gift card or loyalty card on the user computing device 110, the method 260 proceeds to block 360.

In block 360, the account management system 140 determines whether the indication comprises a display of a financial account card on the user computing device 110. In an example embodiment, the user has saved an account identifier in the user computing device 110. When the user accessed the saved account identifier, the user computing device 110 displays the identifier for the user to read or present to the merchant system 120. In an example embodiment, the indication also comprises a location of the user computing device 110 when the identifier was displayed. In this embodiment, the account management system 140 uses the location to determine whether it corresponds to a merchant location.

If the account management system 140 determines that the indication comprises a display of a financial account card on the user computing device 110, the method 260 proceeds to block 365 and the account management system logs the indication as a trigger event.

The method 260 then proceeds to block 370.

Returning to block 360, if the account management system 140 determines that the indication does not comprise a display of a financial account card on the user computing device 110, the method 260 proceeds to block 370.

In block 370, the account management system 140 determines whether the indication comprises a transaction receipt. In an example embodiment, the user has associated or registered an electronic message (e-mail) account with the user's account management system 140 account. In this embodiment, the user may opt to receive an electronic version of the transaction receipt for the purchase transaction via e-mail. The account management system 140 reviews the e-mail message to determine if it comprises a receipt. In another example embodiment, the user may scan or manually enter the transaction receipt into the user's account management system 140 account. In another example embodiment, the account management system 140 extracts information from the receipt. For example, purchase information, merchant name, and other information that identifies the purchase and whether an offer was redeemed.

If the account management system 140 determines that the indication comprises a transaction receipt, the method 260 proceeds to block 375 and the account management system logs the indication as a trigger event.

The method 260 then proceeds to block 380.

Returning to block 370, if the account management system 140 determines that the indication does not comprise a purchase receipt, the method 260 proceeds to block 380.

In block 380, the account management system 140 determines whether the indication comprises a display of an offer on the user computing device 110. In an example embodiment, the user has saved the offer in the user computing device 110 or in the user's account management system 140 account. When the user accessed the saved offer, the user computing device 110 displays the offer for the user to read or present to the merchant system 120. In an example embodiment, the indication also comprises a location of the user computing device 110. In an example embodiment, the user computing device 110 was located at the merchant location when the offer was presented. In this embodiment, the account management system 140 uses the location to determine whether it corresponds to a merchant location.

If the account management system 140 determines that the indication comprises a display of an offer on the user computing device 110, the method 260 proceeds to block 385 and the account management system logs the indication as a trigger event.

In an example embodiment, the account management system 140 adds and modifies the events or signals it looks for in the indications based on the predictive model. For example, if the predictive model determines that the user entering search criteria for a merchant location and then the user computing device 110 being located at the merchant location is a factor that may indicate that the user completed a purchase transaction, the account management system will make the appropriate determination when evaluating whether a trigger event has occurred.

The method 260 then proceeds to block 270 in FIG. 2.

Returning to FIG. 2, in block 270, the account management system 140 determines that the user redeemed an offer in connection with the completed purchase transaction. In an example embodiment, the account management system 140 uses the one or more trigger events to determine whether the user completed a purchase transaction and redeemed an offer.

In an example embodiment, the account management system 140 retrieves the electronic offer instance or other indication that the user selected the offer distributed by the account management system 140. The account management system 140 reviews the offer instance and determines the merchant computing system 120 associated with the offer instance. For example, the account management system 140 determines the merchant location(s) and/or merchant name. In an example embodiment, the account management system 140 reviews the recorded trigger events to determine a likelihood that each event is associated with the offer by determining a likelihood that each event is associated with the merchant location(s) and/or merchant name associated with the offer instance.

In an example embodiment, the account management system 140 reviews the recorded trigger events to determine a likelihood that the user completed a purchase transaction and redeemed an offer. In an example embodiment, the recorded trigger events are weighted based on a strength of the trigger event and/or the likelihood that the trigger event resulted from the user completed a purchase transaction and redeemed an offer. For example, if a change in a gift card balance is detected, the account management system 140 may assign a lower weight if the gift card is available for use at multiple merchants (for example, a Issuer A Gift Card) than if the gift card is available for use at a single merchant (for example, a Merchant X Gift Card). In another example, the account management system 140 may assign a higher weight to a change in a merchant loyalty account or gift card balance than a detection that the loyalty account or gift card information has been displayed.

The recorded trigger events can be viewed in conjunction with one another. For example, the recorded location of the user computing device 110 is at the merchant location. The recorded location of user computing device 110 can be used in connection with other signals to provide a greater likelihood that the action was taken in connection with a purchase transaction and redemption of an offer. For example, if the user computing device 110 displays financial account information or the offer and the location of the user computing device 110 is at the merchant location at a time when the information was displayed, the account management system 140 will assign a higher weight to trigger event, resulting in a higher likelihood that the user completed a purchase transaction and redeemed an offer. In another example, the account management system 140 determines the probability that the change in Gift Card A balance and the user computing device 110 having been located at a location of Merchant X is due to the user completing a purchase transaction with Merchant X and/or redeeming Offer Z. In an example embodiment, the location of the user computing device 110 at Merchant X provides an additional trigger event signal to aid in the determination that the purchase transaction occurred. In an example embodiment, other data, for example an indication that Gift Card A can only be redeemed at a limited number of merchants provides additional trigger event signal data. Multiple trigger event signals can be used to calculate the probable reason for the data.

In an example embodiment, the weighted trigger events are reviewed and a likelihood that the trigger events are related to the recorded offer instance. In an example embodiment, the trigger events are weighed by and the determination is made using the predictive model. In this example embodiment, the trigger event data is added to the predictive model and the model determines a probability that the trigger events occurred because the user completed a purchase transaction and/or redeemed the offer.

In block 275, the account management system 140 assigns a confidence value to the determination whether a purchase transaction was completed and/or an offer was redeemed. In an example embodiment, the confidence value is obtained by calculating a likelihood that the determination is correct. For example, a greater confidence value may be assigned when a greater number of trigger events are received and a lower confidence value may be assigned when a lower number of trigger events are received. In another example, the confidence value may result from or be calculated using the weights assigned to each trigger event. In this example, a weighted average can be calculated and compared to a set of pre-determined threshold values to determine the confidence value.

In another example embodiment, the confidence value is obtained by calculating a likelihood that the determination is correct given the trained model or classifier. For example, the account management system 140 determines whether similar trigger event signal data have been previously received that corresponded to the completion of a purchase transaction and/or redemption of an offer. In an example embodiment, new trigger event signals are received and the predictive model uses the new signals in combination with previously received signals to make the determination.

In block 280, the account management system 140 updates the predictive model or classifier model based on the trigger event signal data. In an example embodiment, the process is an ongoing learning process, wherein data is continuously added to the account management system 140 and the model is continuously updated.

In block 290, the account management system 140 determines that the confidence value is over a pre-determined threshold value, and accordingly that the user completed a purchase transaction and redeemed the offer. In an example embodiment, the account management system 140 marks the offer as redeemed.

In an example embodiment, the account management system 140 determined that a purchase transaction has likely occurred between the merchant and the user based on the trigger events and the information known about the offer in the offer instance. The account management system 140 determines a probability that the offer was redeemed and marks it accordingly.

In an example embodiment, the account management system 140 updates the user's account management system 140 account and distributes an additional offer to the user based on the knowledge that the user redeemed the previous offer. In another example embodiment, the account management system 140 logs the redemption of the offer and transmits a record of the number of redemptions, the redemption rate, or other redemption-related data to the merchant system 120 or offer creator.

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to infer purchases, comprising:
    transmitting, by one or more computing devices, an offer to a user computing device, the one or more computing devices not taking part in approvals of financial transactions and not participating in redemption offers;
    determining, by the one or more computing devices, that the user interacted with the offer via the user computing device;
    displaying, by an application executing on the user computing device, the offer on a user interface of the user computing device;
    displaying, by the application executing on the user computing device, an account identifier on the user interface of the user computing device;
    detecting, by the application executing on the user computing device, a geolocation of the user computing device when the account identifier is displayed on the user interface and responsive to displaying the account identifier on the user interface;
    determining, by the application executing on the user computing device, a first time when the account identifier is displayed on the user interface and responsive to displaying the account identifier on the user interface;
    transmitting, by the application executing on the user computing device, a notification to the one or more computing devices when the account identifier is displayed on the user interface and responsive to displaying the account identifier on the user interface, the notification comprising an indication that the account identifier was displayed, the detected geolocation, the determined first time, and a description of the account identifier;
    receiving, by the one or more computing devices, the notification from the application executing on the user computing device when the account identifier is displayed on the user interface of the user computing device;
    receiving, by the one or more computing devices, a second notification from an account computing system when a balance is adjusted, the second notification comprising an indication that the account balance was adjusted, a second time when the balance is adjusted and a description of the balance;
    determining, by the one or more computing devices, that the indication that the account identifier was displayed and the indication that the balance was adjusted are pre-determined inputs used for identifying purchase transactions;
    determining, by the one or more computing devices, that the user participated in a purchase transaction with a merchant using a predictive model to analyze the indication that the account identifier was displayed, the detected geolocation, the determined first time, the second time, and the indication that the balance was adjusted
    determining, by the one or more computing devices, that the offer was redeemed during the purchase transaction, the one or more computing devices not taking part in an approval of the purchase transaction and not participating in redemption of the offer; and
    marking, by the one or more computing devices, the offer as redeemed in response to determining that the offer was redeemed during the purchase transaction.

2. The method of claim 1, wherein the account identifier displayed by the user computing device comprises a loyalty account identifier.

3. The method of claim 1, wherein the account identifier displayed by the user computing device comprises a financial account identifier.

4. The method of claim 1, wherein the balance adjusted is a gift card balance.

5. The method of claim 1, wherein the balance adjusted is a loyalty account balance.

6. The method of claim 1, further comprising receiving, by the one or more computing devices, a third notification comprising a receipt record.

7. The method of claim 6, wherein determining that the user participated in the purchase transaction with the merchant further comprises analyzing, by the one or more computing devices, the receipt record.

8. The method of claim 1, further comprising:
    determining, by the one or more computing device, a second offer to distribute to the user computing device based on the determination that the offer was redeemed during the purchase transaction with the merchant; and
    transmitting, by one or more computing devices, the second offer to the user computing device.

9. A system to infer purchase transactions, comprising:
    a user computing device, the user computing device comprising a first storage device having first application code instructions stored therein, and a first hardware processor communicatively coupled to the first storage device, wherein the first application code instructions, when executed by the first hardware processor, cause the user computing device to:
        display an offer on a user interface of the user computing device;
        display an account identifier on the user interface of the user computing device;
        detect a geolocation of the user computing device when the account identifier is displayed on the user interface and responsive to displaying the account identifier on the user interface;

determine a first time when the account identifier is displayed on the user interface and responsive to displaying the account identifier on the user interface;

transmit a notification to an account management computing system when the account identifier is displayed on the user interface and responsive to displaying the account identifier on the user interface, the notification comprising an indication that the account identifier was displayed, the detected geolocation, the determined first time, and a description of the account identifier;

an account computing system, the account computing system comprising a second storage device having second application code instructions stored therein, and a second hardware processor communicatively coupled to the second storage device, wherein the second application code instructions, when executed by the second hardware processor, cause the account computing system to:

detect a second time when a balance is adjusted;

transmit a second notification to the account management computing system when the balance is adjusted and responsive to the detection of the balance being adjusted, the second notification comprising an indication that the balance was adjusted, the second time, and a desertion of the balance;

an account management computing system, the account management computing system not taking part in the approval of financial transactions and not participating in redemptions of offers, the account management computing system comprising a storage device having application code instructions stored therein, and a hardware processor communicatively coupled to the storage device, wherein application code instructions, when executed by the hardware processor, cause the account management computing system to:

determine that a user interacted with the offer via the user computing device;

receive the notification from the user computing device when the account identifier is displayed by the user interface of the user computing device;

receive the second notification from the account computing system when the balance is adjusted;

determine that the indication that the account identifier was displayed and the indication that the balance was adjusted are pre-determined signals used for identifying purchase transactions;

determine that the user participated in a purchase transaction with a merchant using a predictive model to analyze the indication that the account identifier was displayed, the detected geolocation, the determined first time, the second time, and the indication that the balance was adjusted;

determine that the offer was redeemed during the purchase transaction with the merchant without the one or more computing devices taking part in an approval of the purchase transaction and without participating in redemption of the offer; and mark the offer as redeemed in response to determining that the offer was redeemed during the purchase transaction with the merchant.

10. The system of claim 9, wherein the account identifier displayed. by the user computing device comprises a loyalty account identifier.

11. The system of claim 9, wherein the account identifier displayed. by the user computing device comprises a financial account identifier.

12. The system of claim 9, wherein the balance adjusted is a gift card balance or a loyalty account balance.

* * * * *

UNITED STATES PATENT AND TRADEMARK OFFICE
CERTIFICATE OF CORRECTION

PATENT NO. : 10,096,037 B2
APPLICATION NO. : 14/595193
DATED : October 9, 2018
INVENTOR(S) : Harry Lee Butler, IV et al.

Page 1 of 1

It is certified that error appears in the above-identified patent and that said Letters Patent is hereby corrected as shown below:

In the Claims

Column 20, Claim 8, Line 48 should read "--determining, by the one or more computer devices, a--"

Signed and Sealed this
Thirteenth Day of November, 2018

Andrei Iancu
*Director of the United States Patent and Trademark Office*